United States Patent
Urbano et al.

(10) Patent No.: US 6,469,096 B1
(45) Date of Patent: Oct. 22, 2002

(54) EMULSIFIERS FOR HIGH-SOLIDS ALKYD RESIN EMULSIONS

(75) Inventors: Edmund Urbano, Graz (AT); Michael Gobec, Graz (AT); Oliver Ferk, Graz (AT)

(73) Assignee: Solutia Austria GmbH (AT)

( * ) Notice: Subject to any disclaimer, the term of this patent is extended or adjusted under 35 U.S.C. 154(b) by 92 days.

(21) Appl. No.: 09/670,078

(22) Filed: Sep. 26, 2000

(30) Foreign Application Priority Data

Oct. 15, 1999 (AT) .............................................. 1737/99

(51) Int. Cl.$^7$ .......................... C08L 67/00; C08L 67/08; C08G 63/48
(52) U.S. Cl. ...................... 524/513; 427/388.4; 516/74; 516/77; 526/911; 528/295.5
(58) Field of Search ...................... 516/74, 77; 526/911; 528/295.5; 560/127; 524/802, 845, 513

(56) References Cited

U.S. PATENT DOCUMENTS

| | | | |
|---|---|---|---|
| 2,322,820 A | * 6/1943 | Brown ...................... 516/74 X |
| 3,269,967 A | 8/1966 | Broadbead et al. |
| 3,300,413 A | * 1/1967 | Ames ........................ 516/77 X |
| 3,440,193 A | 4/1969 | Campagna |
| 3,457,206 A | 7/1969 | Tonner |
| 3,996,134 A | * 12/1976 | Osborn et al. ................ 516/74 |
| 4,410,687 A | 10/1983 | Schimmel et al. ....... 528/295.5 |
| 4,413,116 A | * 11/1983 | Reuter et al. ........ 528/295.5 X |

FOREIGN PATENT DOCUMENTS

| | | | |
|---|---|---|---|
| AT | 333 035 | 10/1975 | |
| AT | 325 742 | 11/1975 | |
| AT | 333 035 B | 10/1976 | |
| AT | 336 277 | 4/1977 | |
| EP | 0 063 292 | * 10/1982 | .............. 528/295.5 |
| EP | 0 325 054 A2 | 7/1989 | |
| JP | 62032154 A | 2/1987 | |
| WO | WO 94/18260 | 8/1994 | |

\* cited by examiner

Primary Examiner—Richard D. Lovering
(74) Attorney, Agent, or Firm—ProPat, L.L.C.

(57) ABSTRACT

A water-soluble or water-dispersible polyester B useful as emulsifier for aqueous emulsions of alkyd resins A, wherein the polyester B is obtainable by reacting, under polycondensation conditions, polyhydroxyl components Ba from the class of the sugar alcohols having more than 4 carbon atoms and at least five hydroxyl groups per molecule, alkoxypolyethylene glycols Bb having 1 to 4 carbon atoms in the alkyl radical and a number-average molar mass $M_n$ of from 500 to 2000 g/mol, cycloaliphatic dicarboxylic acids Bc and unsaturated or saturated fatty acids Bd having 10 to 22 carbon atoms, a process for its preparation, and alkyd resin emulsions prepared therewith.

7 Claims, No Drawings

EMULSIFIERS FOR HIGH-SOLIDS ALKYD RESIN EMULSIONS

BACKGROUND OF THE INVENTION

1. Field of the Invention

The invention relates to water-soluble (or water-dispersible polyesters suitable as emulsifiers for alkyd resins, to the high-solids alkyd resin emulsions prepared therewith, and to their use.

2. Description of the Prior Art

In recent years, water-dilutable binders have been developed for paints and other coating compositions in various forms, essentially for environmental reasons. For reasons of preparation, stabilization or their further processing, the aqueous alkyd resin emulsions used for high-quality coating compositions have a low mass fraction of solids of not more than 45%, and they also usually comprise organic solvents and/or volatile neutralizing agents, such as amines and ammonia.

It is true that the amount of organic solvents may be reduced, as described in U.S. Pat. No. 3,269,967 and 3,440,193, using emulsifiers such as alkylphenol ethoxylates and fatty alcohol ethoxylates. These low molar mass substances remain unchanged in the cured film, however, and influence the service properties of the films adversely, such as the rate and extent of drying, hardness, water resistance, and weathering stability.

In the Austrian patents AT-B 325 742, 333 035 and 336 277, polyethylene-glycol-modified emulsifier resins are used to emulsify alkyd resins, as a result of which the aforementioned disadvantages are said to be substantially avoided. However, it is necessary to add a large amount of neutralizing agents and organic cosolvents to these binders in order to obtain stable emulsions. Owing to the high amount of emulsifier resin which is necessary in this case, the films obtained from such binder emulsions likewise exhibit deficiencies in water resistance and weathering stability.

Using both alkoxypolyethylene glycol (polyethylene glycol monoalkyl ethers) and cocondensed units derived from polyhydroxycarboxylic acids to hydrophilicise the alkyd resin does lead, according to U.S. Pat. No. 3,457,206, in conjunction with the neutralization of free carboxyl groups of the resin using alkanolamines and alkali metal hydroxides, to aqueous alkyd resins, but these resins are unsuitable for high-solids coating compositions and exhibit poor weathering stability.

According to WO 94/18260, the use of alkoxypolyethylene glycol makes it possible, even without the neutralization of acidic groups, to obtain water-soluble resins which find application as dispersants or wood preservatives. These resins, however, are readily hydrolysable in aqueous solution and cannot be diluted with water until shortly before use, and they are unsuitable for weather-resistant coatings.

Surprisingly it has now been found that high-solids aqueous emulsions of alkyd resins are obtained if the emulsions are prepared using selected polyesters as emulsifier resins and under certain process conditions. The term "high-solids" here refers to aqueous alkyd resin emulsions having a mass fraction of solids of 55% or more, preferably at least 60%.

SUMMARY OF THE INVENTION

The present invention accordingly provides a water-soluble or water-dispersible polyester B as emulsifier for aqueous emulsions of alkyd resins A, wherein the polyester B is obtained by reacting, under polycondensation conditions, polyhydroxyl components Ba from the class of the sugar alcohols having more than 4 carbon atoms and at least three, preferably at least four, and with particular preference at least five hydroxyl groups per molecule, alkoxypolyethylene glycols Bb having 1 to 4 carbon atoms in the alkyl radical and a number-average molar mass $M_n$ of from 500 to 2000 g/mol, cycloaliphatic dicarboxylic acids Bc and unsaturated or saturated fatty acids Bd having 10 to 22 carbon atoms.

Monocarboxylic acids Be which are different from the fatty acids Bd may also be used as further components in the mixture of starting materials.

To prepare the polyesters B it is preferred to use the following mass fractions in the mixture of starting materials:

from 10 to 40%, preferably from 15 to 35%, of the polyhydroxyl component Ba, from 35 to 70%, preferably from 40 to 60%, of the alkoxypolyethylene glycol Bb, from 10 to 30%, preferably from 15 to 25%, of the cycloaliphatic dicarboxylic acid Bc, from 15 to 40%, preferably from 20 to 35%, of the fatty acid Bd, and from 0 to 15%, preferably from 3 to 10%, of another monocarboxylic acid Be which is different from Bd.

The polycondensation is conducted preferably up to an acid number of the polycondensate B of less than 10 mg/g, the solution of B in water having a mass fraction of solids of from 30 to 60% and a dynamic viscosity of from 5000 to 50,000 mPa·s.

The invention further provides aqueous alkyd resin emulsions having a mass fraction of solids of preferably from 60 to 80%, comprising mass fractions, based on the solids of the emulsion, of from 70 to 97%, preferably from 80 to 95%, of a water-insoluble alkyd resin A having an oil content of from 40 to 85%, preferably from 45 to 75%, and an acid number of less than 15 mg/g, preferably less than 10 mg/g, and from 3 to 30%, preferably from 5 to 20%, of the polyester B used as emulsifying resin. The mass fractions of A and B are chosen so that their sum is 100%.

The present invention still further provides a process for preparing the aqueous alkyd resin emulsion of the invention, comprising the synthesis of the emulsifier resin component B by reacting the stated components Ba to Be at a temperature of from 160 to 250° C. under esterification conditions, it being possible also to add the conventional amounts of the known catalysts which accelerate the esterification reaction.

The water formed by the esterification reaction is preferably stripped off by means of an inert gas stream which is passed through the reaction mixture or by means of an organic solvent which forms an azeotrope with water. In the latter case, following separation of the water, the solvent is recycled to the reaction mixture and distilled off after the end of the reaction. After this come the following steps: diluting the resultant emulsifier resin with water to a mass fraction of solids of from about 30 to about 60%, the viscosity of the aqueous solution being preferably between 5000 and 50,000 mPa·s; mixing the water-insoluble alkyd resin A with the aqueous solution of the emulsifier resin at a temperature below 100° C.; and, finally, diluting the resultant mixture with water to a mass fraction of solids of the resultant emulsion of preferably from about 60 to 80% and a dynamic viscosity of preferably from 500 to 3000 mPa·s.

The mixing of alkyd resin A and emulsifier B may take place such that the alkyd resin in liquid or, if desired, melted form is stirred into the aqueous solution of the polyester. It is also possible to stir the aqueous solution of the polyester B into the liquid or melted alkyd resin, in which case its temperature should then preferably not be more than 120° C. One advantageous embodiment is the preparation of the emulsion in a mixing tube which preferably contains static mixers. A further favorable mode of preparation is that of mixing in a rotor/stator dispersing unit. In each case, however, it is necessary to prepare an aqueous solution or dispersion of the polyester B beforehand.

The invention still further provides for the use of the alkyd resin emulsions of the invention as binders in coating compositions, especially in paints and other coating materials.

DESCRIPTION OF THE PREFERRED EMBODIMENTS

It was surprising and unforeseeable that by virtue of the specific structure of the water-soluble polyester B used as emulsifying resin a sufficiently high hydrolysis stability of the aqueous solution and a broad compatibility with the alkyd resins to be emulsified are achieved which make it possible to emulsify solvent-free alkyd resins in the form of their melt at a temperature of up to 100° C.

During the mixing of the components, an oil-in-water emulsion is formed, so that the emulsion obtained may be diluted to the desired solids content after just short homogenization. As a result, there is no incidence of the very sharp increases in viscosity which are found at the beginning of the addition of water in conventional processes, in which the emulsifier or emulsifier resin is premixed with the resin to be emulsified, and which may prevent or at least hinder homogenization.

With the aid of the water-soluble polyesters B of the invention and of the process described, it is possible to convert different alkyd resins A, which per se are not water-soluble and which serve as binders for coating materials, into stable aqueous emulsions suitable for further processing and application. The preferred water-insoluble alkyd resins include medium-oil or long-oil alkyd resins having an oil content (mass fraction) of from 40 to 85%, which may if desired have been modified in a known manner, for example, by means of rosin or the incorporation of urethane groups. Mixtures of these resins may of course also be employed, provided they are "compatible" (i.e., miscible without phase separation) with one another.

The oil content is defined as the mass fraction of the oils, or of the units derived from oils, in the alkyd resin, always calculated as triglycerides.

The acid number is defined in accordance with DIN 53 402 (DIN EN ISO 3682) as the ratio of the mass $m_{KOH}$ of potassium hydroxide required to neutralise a sample under analysis to the mass $m_B$ of this sample (mass of the solids in the sample in the case of solutions or dispersions); its customary unit is "mg/g".

The structure and the preparation of these resins A are known to the skilled worker and described at length in the relevant technical literature. The resins are used advantageously in their 100% form (i.e., without the addition of solvents or diluents).

The water-soluble polyester used as component B serves as an emulsifying resin and is used in the form of its aqueous solution having a mass fraction of solids of from 30 to 60% and a dynamic viscosity of from 5000 to 50,000 mPa·s. The pH of this solution is from 2.5 to 5 but has little influence on the stability of the products of the invention. Thus, these solutions are notable for a constant viscosity and minimal increase in acid number during a storage period of 4 weeks. The hydrolysis-resistant character is apparently achieved by the use, in accordance with the invention, of sugar alcohols as polyhydroxyl component and cycloaliphatic dicarboxylic acids as polycarboxyl component.

In the esterification of the sugar alcohols Ba there is probably dehydration and ring closure to give anhydro forms, thereby surprisingly achieving better compatibility with the alkyd resins to be emulsified and higher stability of the alkyd resin emulsions of the invention.

Sugar alcohols Ba used are preferably hexitols ($C_6$ sugar alcohols), but they may be partly or even wholly replaced by pentitols ($C_5$ sugar alcohols). Among the hexitols, preference is given to the use of sorbitol, mannitol and dulcitol, and among the pentitols, to the use of arabitol and xylitol, and also mixtures thereof.

The alkoxypolyethylene glycols Bb have 1 to 8, preferably 1 to 4, carbon atoms in the alkoxy radical and a number-average molar mass of from 500 to 2000, preferably from 600 to 1800, g/mol. Up to 20% of the oxyethylene units may also have been replaced by oxypropylene units. Particular preference is given to methoxy-, ethoxy- and n-butoxy-polyethylene glycols having a number-average molar mass of from 600 to 1800 g/mol.

Suitable cycloaliphatic dicarboxylic acids Bc are saturated and also partly unsaturated acids having 6 to 12, especially 8 to 10, carbon atoms, such as hexahydrophthalic acid, tetrahydrophthalic acid and its alkyl derivatives, e.g., methyltetrahydrophthalic acid, which are used preferably in the form of their anhydrides. It is likewise possible to use cyclohexane-1,3- and -1,4-dicarboxylic acid and the dicarboxylic acids derived from polycyclic, especially bicyclic hydrocarbons, or the anhydrides of these acids, such as; for example, bicyclo[2.2.2]oct-5-ene-2,3-dicarboxylic anhydride. Surprisingly, fumaric acid, succinic anhydride and maleic anhydride, and also aromatic dicarboxylic acids such as phthalic acid, isophthalic acid and terephthalic acid, for example, have not proven suitable; they result in a higher hydrolysis rate and poorer stability of the alkyd resin emulsions.

For the emulsification of oxidatively drying alkyd resins, preference is given to unsaturated fatty acids Bd having an iodine number of at least 100, preferably from 120 to 200, in which isolated and conjugated double bonds may be present. They are obtained, for example, from vegetable oils such as soybean oil, from fish oil, from sunflower oil, linseed oil, safflower oil, and cottonseed oil by hydrolysis, or originate from the distillation of tall oil. Fatty acids with conjugated double bonds .are obtained by catalytic isomerization of natural fatty acids or from dehydrated castor oil (ricinene fatty acid).

In addition, it is also possible, in whole or in part, to use saturated fatty acids Bd having 10 to 22 carbon atoms, provided oxidative drying of component B is not required. Suitable examples include lauric acid,-palmitic acid, and stearic acid.

In order to modify component B it is also possible to use other monocarboxylic acids Be having 6 to 40 carbon atoms which are not fatty acids, especially branched or cyclic aliphatic or else aromatic carboxylic acids. Examples of suitable acids are benzoic acid, tert-butylbenzoic acid, resin acids as present in rosin, and branched carboxylic acids such as isononanoic acid or Versatic acid, for example.

To prepare the emulsion, the components are mixed in a mass ratio of preferably from 70 to 95% of component A and from 5 to 30% of component B (in the form of the aqueous solution), based in each case on the mass of the solids. After thorough homogenization, the emulsion obtained in this way may be diluted to the desired solids content, exhibiting a uniform drop in viscosity if further amounts of water are added.

In the process of the invention, melted solid resins having a temperature of up to 120° C. may also be added as component A to the cold, aqueous emulsifier resin solution, so as to give a mixing temperature of not more than 100° C. The addition of the aqueous emulsifying resin solution to the melted solid resin is also possible, provided a mixing temperature of 100° C. is not exceeded as a result.

Depending on the nature of the emulsified alkyd resins the emulsions prepared in accordance with the invention may be used as binders for paints, and also for coating compositions of textiles or mineral materials and the like. In the coatings sector, it is possible to formulate clearcoats, glazes, primers and topcoats on the basis of the emulsions of the invention.

For the coating of workpieces comprising iron or steel, the emulsions are preferably used with a pH of more than 7, in order to avoid the formation of flash rust which occurs when acidic aqueous paint systems are used. The establishment of the pH using alkali metal hydroxides or alkaline earth metal hydroxides may take place in any phase of the process, having no influence on the stability of the emulsion.

The examples which follow illustrate the invention. All figures in parts and concentrations in percent are mass fractions unless stated otherwise. The viscosity measurements were conducted in accordance with DIN ISO 3219 at 23° C. The following products were used in the examples:

Component A

As component A, commercially available customary alkyd resins were used in their solvent-free form (100% mass fraction of solids). Table 1 summarises their description and characteristic data.

phthalic anhydride, 1 kg of triphenylphosphine and 2 kg of dibutyltin dilaurate as catalyst were heated to 180° C., 820 kg of methoxypolyethylene glycol having a number-average molar mass of 750 g/mol were added, and the mixture was heated further to 230° C. Azeotropic distillation at 230° C. using xylene as azeotrope former and subsequent distillation under reduced pressure to remove the azeotrope former gave 1850 kg of 100% product having an acid number of 3 mg/g and a dynamic viscosity, diluted with water to a mass fraction of solids of 45%, of 7500 mPa·s.

EXAMPLE $B_2$

As in Example $B_1$, 860 kg of linseed oil fatty acid, 735 kg of sorbitol, 805 kg of hexahydrophthalic anhydride, 2 kg of triphenylphosphine and 4 kg of dibutyltin dilaurate as catalyst were heated to 180° C., 2300 kg of n-butoxypolyethylene glycol having a number-average molar mass of 750 g/mol were added, and the mixture was heated further to 230° C. Azeotropic distillation at 230° C. using xylene as azeotrope former and subsequent distillation under reduced pressure to remove the azeotrope former gave 4500 kg of 100% product having an acid number of 2.5 mg/g and a dynamic viscosity, diluted with water to 50%, of 5200 mPa·s.

EXAMPLE $B_3$

As in Example $B_1$, 56 kg of tall oil fatty acid, 55 kg of sorbitol, 66 kg of tetrahydrophthalic anhydride, 0.3 kg of triphenylphosphine and 0.4 kg of dibutyltin dilaurate as catalyst were heated to 180° C., 330 kg of methoxypolyethylene glycol having a number-average molar mass of 1800 g/mol were added, and the mixture was heated further to 230° C. Azeotropic distillation at 230° C. using xylene as azeotrope former and subsequent distillation under reduced pressure to remove the azeotrope former gave 500 kg of 100% product having an acid number of 3 mg/g and a dynamic viscosity, diluted with water to 35%, of 18,000 mPa·s.

TABLE 1

| Component | Characteristics | Hydroxyl number in mg/g | Acid number in mg/g | Viscosity (solution) |
|---|---|---|---|---|
| $A_1$ | drying alkyd resin, 67% soybean oil | about 60 | less than 10 | 150 mPa·s 50% in white spirit |
| $A_2$ | drying alkyd resin, 47% fatty acids, 6% benzoic acid | about 100 | less than 15 | 200 mPa·s 60% in xylene |
| $A_3$ | drying alkyd resin, 75% soybean oil | about 20 | less than 8 | 500 mPa·s 70% in white spirit |
| $A_4$ | drying alkyd resin, 85% fatty acids, 3% Versatic acid glycidyl ester | about 20 | less than 10 | 1700 mPa·s 100% |

The white spirit used had a volume fraction of aromatics of about 18% and a boiling range of from 140 to 180° C.

The hydroxyl number is defined in accordance with DIN 53 240 as the ratio of the mass $m_{KOH}$ of potassium hydroxide which has as many hydroxyl groups as a sample under analysis to the mass $m_B$ of this sample (mass of the solids in the sample in the case of solutions or dispersions); its customary unit is "mg/g".

Component B

EXAMPLE $B_1$

In a standard synthetic resin reactor, 476 kg of sunflower oil fatty acid, 176 kg of sorbitol, 335 kg of tetrahydro- Comparative Example $B_c$ Example B, was repeated but using 326 kg of phthalic anhydride instead of 335 kg of tetrahydrophthalic anhydride. This gave 1840 kg of product having an acid number of 5.5 mg/g and a dynamic viscosity, diluted to 45%. with water, of 3200 mPa·s. The acid number of the aqueous emulsion after four weeks of storage at room temperature was measured again and found to have risen to 12.0 mg/g. The viscosity (under the same measurement conditions) had fallen to 450 mPa·s. Although this solution was likewise suitable as an emulsifying resin component for the alkyd resins of Example $A_1$, $A_2$ and $A_4$ in the case of immediate application ("fresh condition"), the storage stability of the alkyd resin emulsions prepared from it was considerably lower. For instance, with a storage period of just 3 weeks at room temperature, settling of the emulsion was observed. In this state, it was possible to process the emulsion following reagitation, but the coating produced with it gave an unsatisfactory gloss which on storage under humid conditions (50% relative atmospheric humidity, 23° C., four weeks) fell further to less than 50% of the initial value.

EXAMPLES 1 to 7

The emulsions were prepared in accordance with the invention in the proportions and under the conditions stated in Table 2. Component B was charged to a standard synthetic resin reactor with anchor stirrer and the preheated component A was added with stirring over the course of 60 minutes.

Following homogenization for one hour, the product was diluted to the desired solids-content by adding water in portions. Any pH adjustment was made with 5% sodium hydroxide solution.

Table,2 also includes information on the application of the emulsions. This information is familiar to the skilled worker and is guided by the recommendations of the resin manufacturers.

For instance, oxidatively drying systems were admixed with cobalt-zirconium combination dryers (0.09% Co and 0.15% Zr metal content based on resin solids) and with butanone oxime as antiskinning agent, and the drying and film quality were assessed in comparison to the solvent-containing supply form of the resin.

All emulsions gave films which corresponded to the solvent-containing systems in terms of drying properties and film quality. The stability of the emulsions was determined by storage at 40° C. and 80° C. and also 5 freeze-thaw cycles. All emulsions of the invention were still satisfactory after 240 hours (80° C.) and after 600 hours (40° C.). After 5 freeze-thaw cycles, there were no significant changes in the emulsions.

manner using appropriate pigment pastes in the following formulation (mass in grammes):

53.1 resin emulsion (Example 1 to 7, 60 to 70% strength)
0.7 combination dryer, water-dilutable
1.0 antiskinning agent (oxime)
5.0 wax emulsion, aqueous
0.2 substrate wetting agent, water-dilutable
1.0 rheology additive, water-dilutable
0.5 defoamer (silicone-free)
40.3 white pigment paste 70% strength, water-dilutable
2.0 water Following the adjustment of the pH to 8.0–8.5, and following dilution to application viscosity, the paints were applied to metal panels and, following drying in air at room temperature for about 24 hours, were assessed inter alia for gloss and gloss haze. The paints formulated with the alkyd resin emulsions prepared in accordance with the invention showed a very good gloss, 80% at 200, and very good gloss retention. The comparative white paint based on an alkyd resin emulsion prepared using a standard commercial fatty alcohol ethoxylate as emulsifier showed a poorer degree of gloss (51%) and a much lower gloss retention.

Compatibility with other water-dilutable Binders

In contrast to the alkyd resin emulsion C prepared using a conventional emulsifier, the alkyd resin emulsions prepared in accordance with the invention exhibited very good compatibility with other water-dilutable binders, such as acrylic resin dispersions, for example.

What is claimed is:

1. An aqueous alkyd resin emulsion having a mass fraction of an alkyd resin A in the solids of the emulsion of from 70 to 95% and a mass fraction of a polyester B or from 5 to 30%, the mass fractions adding up to 100%, wherein the polyester B is obtained by reacting, under polycondensation conditions, polyhydroxyl components Ba from the class of the sugar alcohols having more than 4 carbon atoms and at least five hydroxyl groups per molecule, alkoxypolyothylene glycols Bb having 1 to 4 carbon atoms in the alkyl radical

TABLE 2

Preparation of the paints and glazes

| | Component A | | | Component B | | Emulsion | | |
|---|---|---|---|---|---|---|---|---|
| | | Mass fraction of | | | Mass fraction of | | | |
| Example | Type | solids of the emulsion in % | Temperature of addition | Type | solids of the emulsion in % | Mass fraction of solids in % | Mass fraction of solids in % | Viscosity in mPa · s | Application |
| 1 | $A_1$ | 90 | 60 | $B_1$ | 10 | 45 | 67 | 1220 | decorating paints |
| 2 | $A_2$ | 85 | 105 | $B_3$ | 15 | 35 | 60 | 2600 | decorating paints |
| 3 | $A_3$ | 92 | 55 | $B_3$ | 8 | 35 | 65 | 840 | wood glazes |
| 4 | $A_4$ | 90 | 30 | $B_2$ | 10 | 50 | 75 | 1710 | wood glazes |
| 5 | $A_1$ | 88 | 55 | $B_2$ | 12 | 50 | 65 | 1350 | decorating paints |
| 6 | $A_1$ | 92 | 55 | $B_3$ | 8 | 35 | 60 | 1180 | decorating paints |
| 7 | $A_1$ | 85 | 30 | $B_1$ | 15 | 45 | 70 | 620 | wood glazes |
| C | $A_1$ | 90 | 60 | E | 10 | 100 | 60 | 1050 | wood glazes |

E: Fatty alcohol ethoxylate, oxyethylene unit content approximately 80%

Preparation of Water-dilutable Paints

The alkyd resin emulsions of Examples 1 to 7 were used to prepare white and colored paints in a conventional and a number-average molar mass $M_n$ of from 500 to 2000 g/mol, cycloaliphatic dicarboxylic acids Bc and unsaturated or saturated fatty acids Bd having 10 to 22 carbon atoms, and where the mass fractions in the mixture of starting materials of the polyester B are from 10 to 40% of the polyhydroxyl component Ba, from 35 to 70% of the alkoxypolyethylene glycol Bb, from 10 to 30% of the cycloaliphatic dicarboxylic acid Bc, and from 15 to 40% of the fatty acid Bd.

2. The aqueous alkyd resin emulsion of claim 1, wherein the mixture of starting materials of the polyester B further comprises a mass fraction of from 0 to 15% of another monocarboxylic acid Be which is different from Bd.

3. The aqueous alkyd resin emulsion of claim 1, wherein the polyester B has an acid number of less than 10 mg/g.

4. The aqueous alkyd resin emulsion as claimed in claim 1, wherein the alkyd resins A have an oil content of from 40 to 85 g/(100 g) and an acid number of less than 15 mg/g.

5. A water-dilutable paint or glaze comprising an alkyd resin emulsion as claimed in claim 1 or 4.

6. A process for preparing an aqueous alkyd resin emulsion as claimed in claim 1, which comprises dissolving the polyester B in water to give a solution having a mass fraction of solids of from 30 to 60%, said solution possessing a dynamic viscosity of from 5000 to 50,000 mPa·s, and mixing the alkyd resin A with this solution under shear conditions.

7. A method of use of a water-dilutable alkyd resin emulsion as claimed in claim 1, comprising formulating a coating composition from the said alkyd resin emulsion, and applying the said coating composition to a substrate selected from the group consisting of textiles, mineral materials, metals, and wood.

\* \* \* \* \*